United States Patent
Tsunogae et al.

(10) Patent No.: US 11,267,956 B2
(45) Date of Patent: Mar. 8, 2022

(54) RUBBER COMPOSITION AND RUBBER CROSSLINKED PRODUCT

(71) Applicant: ZEON CORPORATION, Tokyo (JP)

(72) Inventors: Yasuo Tsunogae, Tokyo (JP); Shingo Okuno, Tokyo (JP); Hiroyuki Nitadori, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 16/344,320

(22) PCT Filed: Oct. 25, 2017

(86) PCT No.: PCT/JP2017/038509
§ 371 (c)(1),
(2) Date: Apr. 23, 2019

(87) PCT Pub. No.: WO2018/079602
PCT Pub. Date: May 3, 2018

(65) Prior Publication Data
US 2019/0256692 A1    Aug. 22, 2019

(30) Foreign Application Priority Data
Oct. 31, 2016 (JP) .............................. JP2016-212962

(51) Int. Cl.
| | |
|---|---|
| *C08L 9/06* | (2006.01) |
| *C08L 7/00* | (2006.01) |
| *C08K 3/013* | (2018.01) |
| *C08G 61/08* | (2006.01) |
| *C08K 5/00* | (2006.01) |
| *C08L 65/00* | (2006.01) |
| *C08L 21/00* | (2006.01) |

(52) U.S. Cl.
CPC ................ *C08L 9/06* (2013.01); *C08G 61/08* (2013.01); *C08K 3/013* (2018.01); *C08K 5/0025* (2013.01); *C08L 7/00* (2013.01); *C08L 21/00* (2013.01); *C08L 65/00* (2013.01); *C08G 2261/418* (2013.01); *C08L 2312/00* (2013.01)

(58) Field of Classification Search
CPC .. C08L 65/00; C08L 21/00; C08L 9/06; C08L 7/00; C08L 2312/00; C08G 61/08; C08G 2261/418; C08K 3/013; C08K 5/0025
See application file for complete search history.

(56) References Cited

U.S. PATENT DOCUMENTS

| | | | | |
|---|---|---|---|---|
| 3,769,369 | A | * 10/1973 | Graulich | ................. C08L 65/00 525/216 |
| 3,816,358 | A | * 6/1974 | Nordsiek | ................ C08L 23/24 525/216 |
| 6,060,570 | A | 5/2000 | Nubel et al. | |
| 6,143,851 | A | 11/2000 | Nubel et al. | |

FOREIGN PATENT DOCUMENTS

| | | | |
|---|---|---|---|
| CN | 106977636 | * | 7/2017 |
| GB | 1 476 424 A | | 6/1977 |
| JP | S50-049353 A | | 5/1975 |
| JP | H11-514043 A | | 11/1999 |
| JP | 2002-317034 A | | 10/2002 |
| JP | 2013-144813 A | | 7/2013 |

OTHER PUBLICATIONS

Machine translation of CN 106977636 (Year: 2017).*
Soybean Oil Plasticizers as Replacement of Petroleum Oil in Rubber by Zoran S. Petrovi'c et al., Rubber Chemistry and Technology, vol. 86, No. 2, pp. 233-249 (2013).*
Apr. 30, 2019 International Preliminary Report on Patentability issued in International Application No. PCT/JP2017/038509.
Jan. 16, 2018 International Search Report issued in International Patent Application No. PCT/JP2017/038509.
Jun. 2, 2020 Search Report issued in European Patent Application No. 17865938.9.

* cited by examiner

*Primary Examiner* — Irina S Zemel
(74) *Attorney, Agent, or Firm* — Oliff PLC

(57) ABSTRACT

A rubber composition containing: a solid rubber (A) having a weight-average molecular weight (Mw) of 100,000 or more; and a liquid monocyclic olefin ring-opened polymer (B) having a weight-average molecular weight (Mw) of 1,000 to 50,000, wherein a proportion of the liquid monocyclic olefin ring-opened polymer (B) is 1 to 100 parts by weight per 100 parts by weight of the solid rubber (A).

10 Claims, No Drawings

RUBBER COMPOSITION AND RUBBER CROSSLINKED PRODUCT

TECHNICAL FIELD

The present invention relates to a rubber composition containing a solid rubber and a liquid monocyclic olefin ring-opened polymer, and more particularly relates to a rubber composition which can apply a crosslinked rubber having high tensile strength and excellent heat resistance and ozone resistance.

BACKGROUND ART

Since a liquid diene elastomer such as liquid polybutadiene or liquid polyisoprene has a double bond in a polymer main chain and has excellent rubber elasticity, the liquid diene elastomer is widely used as a modifier for improving rubber processability, hardness, mechanical strength, and elongation when the liquid diene elastomer is mixed with a solid rubber. For the purposes of improving affinity to the solid rubber and affinity to an inorganic filler, and of introducing a crosslinking point, a modified liquid diene elastomer obtained by introducing a modified group into a liquid diene elastomer has also been known.

However, when the liquid diene elastomer is blended with the solid rubber, and a crosslinked rubber is provided from the blended product, the crosslinked rubber has insufficient mechanical strength such as tensile strength, and has the following problem: the crosslinked rubber has poor heat resistance and ozone resistance. Therefore, there has been required a liquid elastomer having higher mechanical strength and excellent heat resistance and ozone resistance.

Meanwhile, there has been known a technique for subjecting a cyclic olefin to a metathesis ring-opened polymerization reaction in the presence of a chain transfer agent to obtain a cyclic olefin ring-opened polymer. For example, Patent Document 1 discloses a technique for subjecting a cyclic olefin to metathesis ring-opening polymerization using a ruthenium catalyst in the presence of a modified group-containing olefin, to obtain a cyclic olefin ring-opened polymer having a modified group at a polymer chain end thereof. Patent Document 1 discloses that the amount of introduction of the modified group in the obtained cyclic olefin ring-opened polymer can be adjusted by adjusting the ratio of the modified group-containing olefin and the cyclic olefin.

Patent Document 2 discloses a cyclic olefin ring-opened polymer hydrogenated product obtained by partially hydrogenating a carbon-carbon double bond in the main chain structure of a cyclic olefin ring-opened polymer having a weight-average molecular weight of 1,000 to 100,000.

However, the techniques described in Patent Documents 1 and 2 do not disclose a technique for obtaining a liquid cyclic olefin ring-opened polymer, and the polymers cannot be applied as an alternative material of the liquid diene elastomer. In particular, the technique of Patent Document 2 hydrogenates the cyclic olefin ring-opened polymer but causes the hydrogenation reaction to provide a resinous polymer.

RELATED ART

Patent Documents

Patent Document 1: National Publication of International Patent Application No. Heisei 11-514043
Patent Document 2: Japanese Patent Laid-Open No. 2002-317034

SUMMARY OF THE INVENTION

Problem to be Solved by the Invention

The present invention was made in view of such an actual situation, and an object of the present invention is to provide a rubber composition which can apply a crosslinked rubber having high tensile strength and excellent heat resistance and ozone resistance.

Means for Solving the Problem

The present inventors engaged in intensive research for achieving the above object and as a result discovered that the above object can be achieved by blending a solid rubber with a specific amount of a liquid monocyclic olefin ring-opened polymer having a weight-average molecular weight within a specific range, and thereby completed the present invention.

That is, the present invention provides a rubber composition containing: a solid rubber (A) having a weight-average molecular weight (MW) of 100,000 or more; and a liquid monocyclic olefin ring-opened polymer (B) having a weight-average molecular weight (MW) of 1,000 to 50,000, wherein a proportion of the liquid monocyclic olefin ring-opened polymer (B) is 1 to 100 parts by weight per 100 parts by weight of the solid rubber (A).

In the rubber composition of the present invention, the monocyclic olefin ring-opened polymer (B) is preferably a polymer containing only a structural unit derived from a monocyclic monoolefin, or a copolymer containing a structural unit derived from a monocyclic monoolefin and a structural unit derived from a monomer copolymerizable with a monocyclic monoolefin.

In the rubber composition of the present invention, the monocyclic olefin ring-opened polymer (B) is preferably a polymer containing only a structural unit derived from cyclopentene, or a copolymer containing a structural unit derived from cyclopentene and a structural unit derived from a monomer copolymerizable with cyclopentene.

In the rubber composition of the present invention, the monocyclic olefin ring-opened polymer (B) preferably has a melt viscosity of 3,000 Pa·s or less as measured at a temperature of 25° C. using a Brookfield viscometer.

In the rubber composition of the present invention, the monocyclic olefin ring-opened polymer (B) preferably has a glass transition temperature of −50° C. or less.

In the rubber composition of the present invention, the rubber (A) is preferably at least one rubber selected from the group consisting of natural rubber, polyisoprene rubber, styrene butadiene rubber, and polybutadiene rubber.

The rubber composition of the present invention preferably further contains an inorganic filler.

The rubber composition of the present invention preferably further contains a crosslinking agent.

The present invention provides a crosslinked rubber obtained by crosslinking the rubber composition.

Effects of Invention

The present invention can provide a rubber composition which can apply a crosslinked rubber having high tensile strength and excellent heat resistance and ozone resistance, and the crosslinked rubber which is obtained by using the rubber composition and has high tensile strength and excellent heat resistance and ozone resistance.

DESCRIPTION OF EMBODIMENTS

A rubber composition of the present invention contains: a solid rubber (A) having a weight-average molecular weight (Mw) of 100,000 or more; and a liquid monocyclic olefin ring-opened polymer (B) having a weight-average molecular weight (Mw) of 1,000 to 50,000, wherein a proportion of the liquid monocyclic olefin ring-opened polymer (B) is 1 to 100 parts by weight per 100 parts by weight of the solid rubber (A).

According to the present invention, the solid rubber (A) is blended with the liquid monocyclic olefin ring-opened polymer (B), to provide a crosslinked rubber, and thus the crosslinked rubber can have heat resistance and ozone resistance improved while keeping high tensile strength.

<Solid Rubber (A)>

The solid rubber (A) used in the present invention is not particularly limited, and may be a rubber-like polymer having a weight-average molecular weight (Mw) of 100,000 or more, and having a solid state at normal temperature (25° C.) (having shape retainability without exhibiting fluidity at normal temperature (25° C.)). The Mooney viscosity (ML1+4, 100° C.) of the solid rubber (A) measured based on JIS K6300 is usually 20 or more.

Examples of the solid rubber (A) include, but are not particularly limited to, conjugated diene rubbers such as natural rubber (NR), polyisoprene rubber (IR), styrene butadiene rubber (SBR), polybutadiene rubber (BR), styrene-isoprene copolymer rubber, butadiene-isoprene copolymer rubber, polyisoprene-SBR block copolymer rubber, polystyrene-polybutadiene-polystyrene block copolymer, emulsion polymerized styrene-acrylonitrile-butadiene copolymer rubber, and acrylonitrile-butadiene copolymer rubber, olefin rubbers such as ethylene propylene diene rubber (EPDM) and ethylene-propylene rubber; and non-olefin rubbers such as acrylic rubber, epichlorohydrin rubber, fluororubber, silicone rubber, chloroprene rubber, and urethane rubber. Among these, from the viewpoints of high compatibility with the liquid monocyclic olefin ring-opened polymer (B), and an effect provided by blending the liquid monocyclic olefin ring-opened polymer (B), that is, a large effect of improving heat resistance and ozone resistance, olefin rubbers are preferred; conjugated diene rubbers are more preferred; and natural rubber, polyisoprene rubber, styrene butadiene rubber, and polybutadiene rubber are particularly preferred.

The solid rubber (A) may have a weight-average molecular weight (Mw) of 100,000 or more in terms of polystyrene. The weight-average molecular weight (Mw) is measured by gel permeation chromatography. From the viewpoint of further increasing the mechanical strength of the obtained crosslinked rubber, the solid rubber (A) has a weight-average molecular weight (Mw) of more preferably 200,000 or more, and still more preferably 300,000 or more. The upper limit of the weight-average molecular weight (Mw) is not particularly limited, and preferably 2,000,000 or less.

<Liquid Monocyclic Olefin Ring-Opened Polymer (B)>

A liquid monocyclic olefin ring-opened polymer (B) used in the present invention is a polymer containing a repeating unit obtained by subjecting a monocyclic olefin to ring-opening polymerization as a repeating unit which forms a main chain thereof, and is a liquid polymer having a weight-average molecular weight (Mw) of 1,000 to 50,000.

In the liquid monocyclic olefin ring-opened polymer (B) used in the present invention, the ratio of the repeating unit obtained by subjecting a monocyclic olefin to ring-opening polymerization is preferably 70 mol % or more, more preferably 75 mol % or more, and still more preferably 80 mol % or more based on all repeating units. However, as long as the characteristics of the monocyclic olefin ring-opened polymer are maintained, the liquid monocyclic olefin ring-opened polymer (A) may contain a repeating unit derived from other monomer copolymerizable with the monocyclic olefin. The ratio of the repeating unit derived from other monomer is preferably 30 mol % or less, more preferably 25 mol % or less, and still more preferably 20 mol % or less based on all the repeating units. The monocyclic olefin is a hydrocarbon compound which contains one ring and has a carbon-carbon double bond in the ring. The monocyclic olefin may have one carbon-carbon double bond or a plurality of carbon-carbon double bonds (containing no aromatic ring).

Specific examples of the monocyclic olefin include a monocyclic monoolefin having a carbon-carbon double bond in a ring thereof such as cyclobutene, cyclopentene, cyclohexene, cycloheptene, or cyclooctene; a monocyclic diene having two carbon-carbon double bonds in a ring thereof such as 1,4-cyclohexadiene, 1,4-cycloheptadiene, or 1,5-cyclooctadiene; and a monocyclic trien having three carbon-carbon double bonds in a ring thereof such as 1,5,9-cyclododecatriene. Among these, a monocyclic monoolefin is preferred, and from the viewpoint of the compatibility with the solid rubber (A), cyclopentene is more preferred. The monocyclic olefin may have a substituent group, or may not have a substituent group. Examples of the substituent group include, but are not particularly limited to, alkyl groups such as a methyl group and an ethyl group.

Examples of the other monomer copolymerizable with the monocyclic olefin include a polycyclic monoolefin, a polycyclic diene, and a polycyclic trien. As the polycyclic monoolefin, the polycyclic diene, and the polycyclic trien, norbornene compounds which may have a substituent group such as 2-norbornene, dicyclopentadiene, 1,4-methano-1,4,4a,9a-tetrahydro-9H-fluorene, and tetracyclo$[6.2.1.1^{3,6}.0^{2,7}]$ dodec-4-ene are illustrated. Among these, the polycyclic monoolefin and the polycyclic diene are preferred, and 2-norbornene and dicyclopentadiene are more preferred.

When the liquid monocyclic olefin ring-opened polymer (B) is a copolymer, the liquid monocyclic olefin ring-opened polymer (B) may be a copolymer of one monocyclic olefin and a monomer other than one or two or more monocyclic olefins, a copolymer of two or more monocyclic olefins, or a copolymer of two or more monocyclic olefins and a monomer other than one or two or more monocyclic olefins. When the monocyclic olefin ring-opened polymer has structural units derived from two or more monocyclic olefins, the ratio of the structural units derived from all the monocyclic olefins contained in the monocyclic olefin ring-opened polymer may be set to be within the above range.

From the viewpoint of excellent heat resistance and ozone resistance, the liquid monocyclic olefin ring-opened polymer (B) used in the present invention is preferably a polymer containing only a structural unit derived from a monocyclic monoolefin as a repeating unit which forms a main chain thereof, or a copolymer containing a structural unit derived from a monocyclic monoolefin and a structural unit derived from a monomer copolymerizable with a monocyclic monoolefin (also containing a structural unit derived from a monocyclic olefin other than a monocyclic monoolefin), and more preferably a polymer containing only a structural unit derived from cyclopentene, or a copolymer containing a structural unit derived from cyclopentene and a structural unit derived from a monomer copolymerizable with cyclopentene (also containing a structural unit derived from a monocyclic olefin other than cyclopentene) from the viewpoint of the compatibility with the solid rubber (A). The monomer copolymerizable with cyclopentene is preferably a monocyclic diolefin, a polycyclic monoolefin, and a polycyclic diene, and more preferably 1,5-cyclooctadiene, 2-norbornene, and dicyclopentadiene.

When the liquid monocyclic olefin ring-opened polymer (B) used in the present invention is the polymer containing a structural unit derived from a monocyclic monoolefin, the ratio of the structural unit derived from a monocyclic monoolefin is preferably 70 mol % or more, more preferably 75 mol % or more, and still more preferably 80 mol % or more based on all the repeating units. Meanwhile, the ratio of the structural unit derived from a monomer copolymerizable with a monocyclic monoolefin is preferably 30 mol % or less, more preferably 25 mol % or less, and still more preferably 20 mol % or less based on all the repeating units.

When the liquid monocyclic olefin ring-opened polymer (B) used in the present invention is the polymer containing a structural unit derived from cyclopentene, the ratio of the structural unit derived from cyclopentene is preferably 70 mol % or more, more preferably 75 mol % or more, and still more preferably 80 mol % or more based on all the repeating units. Meanwhile, the ratio of the structural unit derived from a monomer copolymerizable with cyclopentene is preferably 30 mol % or less, more preferably 25 mol % or less, and still more preferably 20 mol % or less based on all the repeating units.

The weight-average molecular weight (Mw) of the liquid monocyclic olefin ring-opened polymer (B) used in the present invention is measured by gel permeation chromatography in terms of polystyrene, and 1,000 to 50,000, preferably 1,500 to 45,000, and more preferably 2,000 to 40,000. When the weight-average molecular weight (Mw) is too low, the obtained crosslinked rubber has poor mechanical strength such as tensile strength. Meanwhile, when the weight-average molecular weight (Mw) is too high, the monocyclic olefin ring-opened polymer does not exhibit a liquid form.

The ratio (Mw/Mn) of the weight-average molecular weight (Mw) and number average molecular weight (Mn) measured by gel permeation chromatography in terms of polystyrene, of the liquid monocyclic olefin ring-opened polymer (B) used in the present invention is not particularly limited, and usually 4.0 or less, preferably 3.5 or less, and more preferably 3.0 or less. By setting Mw/Mn to be within the above range, the mechanical strength such as tensile strength, of the obtained crosslinked rubber can be further increased.

The liquid monocyclic olefin ring-opened polymer (B) used in the present invention is a liquid polymer, i.e., a polymer having a liquid state at normal temperature (25° C.) (having fluidity at normal temperature (25° C.)). Specifically, the liquid monocyclic olefin ring-opened polymer (B) is a polymer having fluidity at normal temperature (25° C.) such that a melt viscosity measured at a temperature of 25° C. using a Brookfield viscometer is about 3,000 Pa·s or less. In the present invention, the use of such a liquid monocyclic olefin ring-opened polymer (B) can provide good blending of the liquid monocyclic olefin ring-opened polymer (B) with the solid rubber (A), and thus the crosslinked rubber having high tensile strength and excellent heat resistance and ozone resistance can be provided. The melt viscosity at a temperature of 25° C. of the liquid monocyclic olefin ring-opened polymer (B) used in the present invention is preferably 2,000 Pa·s or less, more preferably 1,000 Pa·s or less, and still more preferably 300 Pa·s or less.

In the double bond present in the repeating unit which forms the liquid monocyclic olefin ring-opened polymer (B) used in the present invention, the cis/trans-ratio thereof is not particularly limited, and is preferably in the range of 15/85 to 60/40, and more preferably in the range of 15/85 to 40/60 from the viewpoint that heat resistance and ozone resistance can be further improved. The cis/trans-ratio can be measured by the $^{13}$C-NMR spectroscopy of the liquid monocyclic olefin ring-opened polymer (B).

A method for setting the cis/trans-ratio of the liquid monocyclic olefin ring-opened polymer (B) to be within the above range is not particularly limited, and examples thereof include a method for polymerizing a monocyclic olefin and controlling a polymerization condition when a liquid monocyclic olefin ring-opened polymer (B) is obtained. In one example, a trans ratio can be increased as a polymerization temperature when a monocyclic olefin is polymerized is increased. The trans ratio can be increased as a monomer concentration in a polymerization solution is decreased.

From the viewpoint of providing the crosslinked rubber having excellent low-temperature characteristics and having rubber elasticity, the glass transition temperature (Tg) of the liquid monocyclic olefin ring-opened polymer (B) used in the present invention is preferably −50° C. or less, more preferably −60° C. or less, and still more preferably −70° C. or less. The glass transition temperature of the liquid monocyclic olefin ring-opened polymer (B) can be adjusted by adjusting, for example, a cis/trans-ratio in a double bond present in a repeating unit, and the content ratio of a structural unit derived from a monomer copolymerizable with a monocyclic olefin, or the like when the liquid monocyclic olefin ring-opened polymer (B) is a copolymer.

In the liquid monocyclic olefin ring-opened polymer (B) used in the present invention, the melt viscosity measured at a temperature of 25° C. using a Brookfield viscometer may be within the above range. The liquid monocyclic olefin ring-opened polymer (B) may have a melting point. When the liquid monocyclic olefin ring-opened polymer (B) has a melting point, the melting point (Tm) is preferably less than 25° C. When the melting point (Tm) of the liquid monocyclic olefin ring-opened polymer is less than 25° C., the monocyclic olefin ring-opened polymer is a liquid polymer at normal temperature (25° C.), which is likely to provide the effects of the present invention. The melting point (Tm) of the liquid monocyclic olefin ring-opened polymer (B) can be adjusted by adjusting, for example, a cis/trans-ratio in a double bond present in a repeating unit, or by adjusting the kind and content ratio of a repeating unit contained in the liquid monocyclic olefin ring-opened polymer (B). In one example, the melting point (Tm) can be decreased by increasing the content rates of a cyclopentene unit and 1,5-cyclooctadiene unit among monocyclic olefin monomer units which forms the liquid monocyclic olefin ring-opened polymer (B). Meanwhile, when the content rate of the cyclooctene unit is increased, the melting point (Tm) is increased, which may cause deterioration in rubber characteristics at normal temperature.

The liquid monocyclic olefin ring-opened polymer (B) used in the present invention may have a molecular structure containing only carbon atoms and hydrogen atoms, or may have a molecular structure containing any atom other than carbon atoms and hydrogen atoms. More specifically, a modified group containing an atom selected from the group consisting of an atom of Group XV in the Periodic Table, an atom of Group XVI in the Periodic Table, a silicon atom, and a halogen atom may be contained in a side chain or at a polymer chain end.

From the viewpoint of affinity with an inorganic filler when the inorganic filler is blended, the modified group containing an atom selected from the group consisting of a nitrogen atom, an oxygen atom, a phosphorus atom, a sulfur atom, a silicon atom, and a halogen atom is more preferred, and among these, the modified group containing an atom selected from the group consisting of a nitrogen atom, an oxygen atom, and a silicon atom is still more preferred. Specific examples of the modified group include an amino group, a hydroxyl group, a hydroxycarbonyl group, a carboxylic anhydride group, an acryloyloxy group, a methacryloyloxy group, an epoxy group, an oxysilyl group, and a halogen atom. Among these, an amino group, a hydroxyl group, a hydroxycarbonyl group, a methacryloyloxy group, and an oxysilyl group are preferred. Specific examples of the oxysilyl group include an alkoxysilyl group, an aryloxysilyl group, an aryloxysilyl group, an alkylsiloxysilyl group, an arylsiloxysilyl group, and a hydroxysilyl group. Among these, the alkoxysilyl group is preferred. The alkoxysilyl group is a group having a silicon atom which is bonded with one or more alkoxy groups. Specific examples thereof include a trimethoxysilyl group, a (dimethoxy)(methyl)silyl group, a (methoxy)(dimethyl)silyl group, a triethoxysilyl group, a (diethoxy)(methyl)silyl group, an (ethoxy)(dimethyl)silyl group, a (dimethoxy)(ethoxy)silyl group, a (methoxy)(diethoxy)silyl group, a tripropoxysilyl group, and a tributoxysilyl group.

The liquid monocyclic olefin ring-opened polymer (B) used in the present invention may be one in which the modified group is introduced to only one polymer chain end (single end), or may be one in which the modified group is introduced to each of both polymer chain ends (both ends), or these may be mixed. Furthermore, the liquid monocyclic olefin ring-opened polymer in which the modified group is introduced and a liquid monocyclic olefin ring-opened polymer in which no modified group is introduced may be mixed.

The ratio of introduction of the modified group at the polymer chain end of the liquid monocyclic olefin ring-opened polymer (B) is not particularly limited, and from the viewpoint of affinity with an inorganic filler when the inorganic filler is blended, the percentage value of the ratio of the number of the modified groups to the number of polymer chains of the liquid monocyclic olefin ring-opened polymer (B) is preferably 60% or more, more preferably 80% or more, and still more preferably 100% or more. The method for measuring the ratio of introduction of the modified group to the polymer chain end is not particularly limited, and the ratio can be determined from, for example, the peak area ratio relative to the modified group determined by $^1$-NMR spectroscopy, and the number average molecular weight (Mn) determined by gel permeation chromatography.

The method for synthesizing the liquid monocyclic olefin ring-opened polymer (B) used in the present invention is not particularly limited as long as the intended polymer is obtained, and such a polymer may be synthesized by an ordinary method. Examples thereof include a method for subjecting a monomer containing a monocyclic olefin to ring-opening polymerization using a ruthenium-carbene complex as a ring-opening polymerization catalyst in the presence of a molecular weight modifier.

The ruthenium-carbene complex is not particularly limited as long as the complex is a ring-opening polymerization catalyst of a monocyclic olefin. Specific examples of the ruthenium-carbene complex preferably used include bis (tricyclohexylphosphine)benzylideneruthenium dichloride, bis(triphenylphosphine)-3,3-diphenylpropenylideneruthenium dichloride, dichloro-(3-phenyl-1H-inden-1-ylidene) bis(tricyclohexylphosphine)ruthenium(II), (3-phenyl-1H-inden-1-ylidene)bis(tricyclohexylphosphine)ruthenium dichloride, bis(tricyclohexylphosphine) t-butylvinylideneruthenium dichloride, bis(1,3-diisopropylimidazolin-2-ylidene)benzylideneruthenium dichloride, bis(1,3-dicyclohexylimidzolin-2-ylidene)benzylideneruthenium dichloride, (1,3-dimesitylimidazolin-2-ylidene)(tricyclohexylphosphine)benzylideneruthenium dichloride, (1,3-dimesitylimidazolidin-2-ylidene)(tricyclohexylphosphine)benzylideneruthenium dichloride, bis(tricyclohexylphosphine) ethoxymethylideneruthenium dichloride, and (1,3-dimesitylimidazolidin-2-ylidene)(tricyclohexylphosphine) ethoxymethylideneruthenium dichloride.

The amount of use of the ruthenium-carbene complex is not particularly limited, and a molar ratio of (metal ruthenium in catalyst:monomer containing monocyclic olefin) is usually 1:2,000 to 1:2,000,000, preferably 1:5,000 to 1:1,500,000, and more preferably 1:10,000 to 1:1,000,000. When the amount of use of the ruthenium-carbene complex is too small, sometimes the polymerization reaction does not sufficiently advance. Meanwhile, when too large, the removal of the catalyst residue from the obtained monocyclic olefin ring-opened polymer becomes difficult, which may cause deterioration in various characteristics as a cross-linked rubber.

Examples of the molecular weight modifier include olefin compounds such as 1-butene, 1-pentene, 1-hexene, and 1-octene; and diolefin compounds such as 1,4-pentadiene, 1,4-hexadiene, 1,5-hexadiene, 1,6-heptadiene, 2-methyl-1,4-pentadiene, and 2,5-dimethyl-1,5-hexadiene.

The amount of use of the molecular weight modifier is not particularly limited, and may be set in accordance with the intended weight-average molecular weight W. The amount of use of the molecular weight modifier is preferably 0.1 to 20 parts by weight, more preferably 0.15 to 15 parts by weight, and still more preferably 0.2 to 10 parts by weight per 100 parts by weight of a monomer containing a monocyclic olefin used for polymerization.

The polymerization reaction may be performed without a solvent or may be performed in a solution. When performing the polymerization in a solution, the solvent used is not particularly limited as long as the solvent is a solvent which is inert in the polymerization reaction and which can dissolve a monomer containing a monocyclic olefin or a polymerization catalyst and the like used for the polymerization. A hydrocarbon-based solvent, an ether-based solvent, or a halogen-based solvent is preferably used. Examples of the hydrocarbon-based solvent include aromatic hydrocarbons such as benzene, toluene, xylene, and ethylbenzene; aliphatic hydrocarbons such as n-hexane, n-heptane, and n-octane; and alicyclic hydrocarbons such as cyclohexane, cyclopentane, and methylcyclohexane. Examples of the ether-based solvent include diethylether, cyclopentyl methyl ether, 1,2-dimethoxyethylene, and tetrahydrofuran. Examples of the halogen-based solvent include alkylhalogens such as dichloromethane and chloroform; and aromatic halogens such as chlorobenzene and dichlorobenzene.

The polymerization temperature is not particularly limited, and usually set to −50 to 100° C. The polymerization reaction time is preferably 1 minute to 72 hours, and more preferably 5 minutes to 20 hours. After the polymerization conversion rate reaches a predetermined value, a known polymerization terminator can be added to the polymerization system to stop the polymerization reaction.

When the liquid monocyclic olefin ring-opened polymer (B) has a modified group at a polymer chain end thereof, ring-opening polymerization is preferably performed in the presence of an olefin compound having a modified group. Since the olefin compound having a modified group has a function of introducing the modified group to the polymer chain end, and also functions as the molecular weight modifier, it is desirable that when the olefin compound having a modified group is used, the molecular weight modifier is not used.

The olefin compound having a modified group is not particularly limited as long as the compound contains at least one ethylenic unsaturated bond and at least one modified group in the molecule. Examples of the modified group include an amino group, a hydroxyl group, a hydroxycarbonyl group, a carboxylic anhydride group, a methacryloyloxy group, an epoxy group, an oxysilyl group, and a halogen atom.

Examples of the olefin compound having the amino group include allylamine, N-allylamine, N-allylbenzylamine, 4-aminostyrene, 2-butene-1,4-diamine, and 3-hexene-2,5-diamine.

Examples of the olefin compound having the hydroxyl group include allylalcohol, 3-buten-1-ol, 4-penten-1-ol, 4-hexen-1-ol, 4-hepten-1-ol, 5-decen-1-ol, 5-hexen-1-ol, 5-octen-1-ol, 6-hepten-1-ol, 4-hydroxystyrene, 2-allylphenol, allyl 4-hydroxybenzoate, 1-cyclohexyl-2-buten-1-ol, ethyleneglycol monoallylether, 3-allyloxy-1,2-propanediol, 2-butene-1,4-diol, and 3-hexene-2,5-diol.

Examples of the olefin compound having the hydroxycarbonyl group include 3-butenoic acid, 4-pentenoic acid, 5-hexenoic acid, trans-3-pentenoic acid, vinylbenzoic acid, and trans-3-hexenedioic acid.

Examples of the olefin compound having the carboxylic anhydride group include allylsuccinic anhydride and (2,7-octadien-1-yl)succinic anhydrite.

Examples of the olefin compound having the methacryloyloxy group include cis-1,4-dimethacryloyloxy-2-butene, allyl methacrylate, and 5-hexenyl methacrylate.

Examples of the olefin compound having the epoxy group include 1,3-butadiene monoepoxide, allylglycidyl ether, 1,2-epoxy-5-hexene, 1,2-epoxy-9-decene, and 1,2,9,10-diepoxy-5-decene.

Examples of the olefin compound having the oxysilyl group include alkoxysilane compounds such as vinyl(trimethoxy)silane, vinyl(triethoxy)silane, allyl(trimethoxy)silane, allyl(methoxy)(dimethyl)silane, allyl(triethoxy)silane, allyl(ethoxy)(dimethyl)silane, styryl(trimethoxy)silane, styryl(triethoxy)silane, 2-styrylethyl(triethoxy)silane, allyl(triethoxysilylmethyl)ether, and allyl(triethoxysilylmethyl)(ethyl)amine; aryloxysilane compounds such as vinyl(triphenoxy)silane, allyl(triphenoxy)silane and allyl(phenoxy)(dimethyl)silane; acyloxysilane compounds such as vinyl(triacetoxy)silane, allyl(triacetoxy)silane, allyl(diacetoxy)methylsilane, and allyl(acetoxy)(dimethyl)silane; alkylsiloxysilane compounds such as allyltris(trimethylsiloxy)silane; arylsiloxysilane compounds such as allyltris(triphenylsiloxy)silane; polysiloxane compounds such as 1-allylheptamethyltrisiloxane, 1-allylnonamethyltetrasiloxane, 1-allylnonamethylcyclopentasiloxane, and 1-allylundecamethylcyclohexasiloxane; alkoxysilane compounds such as 1,4-bis(trimethoxysilyl)-2-butene, 1,4-bis (triethoxysilyl)-2-butene, and 1,4-bis(trimethoxysilylmethoxy)-2-butene; aryloxysilane compounds such as 1,4-bis(triphenoxysilyl)-2-butene; acyloxysilane compounds such as 1,4-bis(triacetoxysilyl)-2-butene; alkylsiloxysilane compounds such as 1,4-bis[tris(trimethylsiloxy)silyl]-2-butene; arylsiloxysilane compounds such as 1,4-bis[tris(triphenylsiloxy)silyl]-2-butene; and polysiloxane compounds such as 1,4-bis(heptamethyltrisiloxy)-2-butene, and 1,4-bis(undecamethylcyclohexasiloxy)-2-butene.

Examples of the olefin compound having the halogen atom include allyl chloride, crotyl chloride, 1,4-dichloro-2-butene, allyl bromide, allyl iodide, crotyl chloride, 1,4-dichloro-2-butene, and 1,4-dibromo-2-butene.

The olefin compounds having the modified group may be used singly or in combinations of two or more.

The amount of use of the olefin compound having the modified group is not particularly limited, and may be set in accordance with the ratio of introduction of the modified group introduced to the polymer chain end of the liquid monocyclic olefin ring-opened polymer (B) and the intended weight-average molecular weight (Mw). The amount of use of the olefin compound having the modified group is preferably 0.1 to 20 parts by weight, more preferably 0.15 to 15 parts by weight, and still more preferably 0.2 to 10 parts by weight per 100 parts by weight of a monomer containing a monocyclic olefin used for polymerization. The olefin compound having the modified group has a function of introducing the modified group to the polymer chain end of the liquid monocyclic olefin ring-opened polymer (B), and also functions as a molecular weight modifier, and thus the amount of use of the olefin compound having the modified group is preferably within the above range also from the viewpoint of controlling the weight-average molecular weight (Mw) of the liquid monocyclic olefin ring-opened polymer (B) to the above range.

By doing the above, it is possible to obtain a polymer solution which contains the liquid monocyclic olefin ring-opened polymer (B). As a method for recovering the polymer from the polymer solution, a known recovery method may be employed. For example, the liquid monocyclic olefin ring-opened polymer (B) can be obtained by mixing a polymer solution with a poor solvent of an excessive polymer to precipitate the polymer, recovering the precipitated polymer, and drying the recovered polymer. Alternatively, the liquid monocyclic olefin ring-opened polymer (B) can be obtained by directly drying a polymer solution to evaporate off an unreacted monocyclic olefin and a solvent.

Alternatively, when the liquid monocyclic olefin ring-opened polymer (B) is synthesized, there may be used a method for subjecting a monomer containing a monocyclic olefin to ring-opening polymerization using a molybdenum compound or a tungsten compound as a ring-opening polymerization catalyst in the presence of a molecular weight modifier in place of the method for using the ruthenium-carbene complex as the ring-opening polymerization catalyst.

Specific examples of the molybdenum compound which can be used as the ring-opening polymerization catalyst include molybdenum pentachloride, molybdenum oxotetrachloride, and molybdenum(phenylimide)tetrachloride. Specific examples of the tungsten compound include tungsten hexachloride, tungsten oxotetrachloride, tungsten(phenylimide)tetrachloride, monocatecholate tungsten tetrachloride, bis(3,5-ditertiary butyl)catecholate tungsten dichloride, bis(2-chloroethelate)tetrachloride, and tungsten oxotetraphenolate.

The same molecular weight modifier as that of the method for using the above ruthenium-carbene complex can be used in the same amount.

When using the molybdenum compound or the tungsten compound as the ring-opening polymerization catalyst, an organometallic compound can be used as a catalytic promoter. Examples of the organometallic compounds which can be used as the catalytic promoter include organometallic compounds of metal atoms of Group I, II, XII, XIII, or XIV of the Periodic Table having hydrocarbon groups having 1-20 carbon atoms. Among these, an organolithium compound, an organomagnesium compound, an organozinc compound, an organoaluminum compound, and an organotin compound are preferably used; an organolithium compound, an organotin compound, and an organoaluminum compound are more preferably used; and an organoaluminum compound is particularly preferably used. The amount of use of the organometallic compound is not particularly limited, and the molar ratio of (molybdenum compound or tungsten compound:organometallic compound) is preferably 1:0.1 to 10, and more preferably 1:0.5 to 5.

The polymerization reaction conditions and the like in the case of using a molybdenum compound or a tungsten compound as a ring-opening polymerization catalyst may be suitably set in the range of the conditions in the case of using the ruthenium-carbene complex.

In the method for using a molybdenum compound or a tungsten compound as a ring-opening polymerization catalyst, when the liquid monocyclic olefin ring-opened polymer (B) has a modified group at a polymer chain end thereof, ring-opening polymerization is preferably performed in the presence of the olefin compound having a modified group as with the case where the ruthenium-carbene complex is used. The molybdenum compound or the tungsten compound generally has low resistance to the olefin compound having a modified group, and thus an olefin compound having a modified group protected by a protective group is preferably used in place of the olefin compound having a modified group.

For example, when the olefin compound having a modified group is an olefin compound having an amino group, a hydroxyl group, or a hydroxy carbonyl group, there can be used one protected by a protective group such as an alkyl group, an acyl group, an RC(O)— group (R represents a saturated hydrocarbon group having 1-10 carbon atoms), a silyl group, or metal alkoxide. Alternatively, there may be used one obtained by reacting an olefin compound having an amino group, a hydroxyl group, or a hydroxy carbonyl group with a trialkyl aluminum compound. The amount of use of the olefin compound having a modified group protected by the protective group in this case may be similar to the amount of use of the olefin compound having a modified group when the ruthenium-carbene complex is used.

When the olefin compound having a modified group protected by the protective group is used, deprotection is performed after the polymerization reaction. The deprotection method is not particularly limited, and may be performed by known techniques in accordance with the used protective group. Specific methods thereof include a deprotection method in accordance with heating and a deprotection method in accordance with hydrolysis or alcoholysis.

As described above, the polymer solution containing the liquid monocyclic olefin ring-opened polymer (B) can be obtained. The known recovery method described when the ruthenium-carbene complex is used may be employed as the method for recovering the polymer from the polymer solution.

To the liquid monocyclic olefin ring-opened polymer (B) obtained by the producing process, an antiaging agent such as a phenol-based stabilizer, a phosphorus-based stabilizer, or a sulfur-based stabilizer may be added as desired. The amount of the antiaging agent added may be suitably determined in accordance with the kind and the like. Furthermore, as desired, an extender oil may also be blended.

<Rubber Composition>

A rubber composition of the present invention contains the solid rubber (A) and the liquid monocyclic olefin ring-opened polymer (B), wherein a proportion of the liquid monocyclic olefin ring-opened polymer (B) is 1 to 100 parts by weight per 100 parts by weight of the solid rubber (A).

The content of the liquid monocyclic olefin ring-opened polymer (B) in the rubber composition of the present invention is 1 to 100 parts by weight, preferably 2 to 80 parts by weight, and more preferably 5 to 60 parts by weight per 100 parts by weight of the solid rubber (A). When the content of the liquid monocyclic olefin ring-opened polymer (B) is too small, an effect provided by blending the liquid monocyclic olefin ring-opened polymer (B), i.e., an effect of improving heat resistance and ozone resistance as a crosslinked rubber is not obtained. Meanwhile, when the content of the liquid monocyclic olefin ring-opened polymer (B) is too large, the tensile strength of the obtained crosslinked rubber decreases.

The rubber composition of the present invention preferably contains, in addition to the solid rubber (A) and the liquid monocyclic olefin ring-opened polymer (B), an inorganic filler. When the rubber composition contains the inorganic filler, the mechanical characteristics of the obtained crosslinked rubber can be improved. Examples of the inorganic filler include metal powders such as aluminum powder; inorganic powders such as carbon black, hard clay, talc, calcium carbonate, titanium oxide, calcium sulfate, calcium carbonate, and aluminum hydroxide; organic powders such as starch and polystyrene powder; short fibers such as glass fiber (milled fiber), carbon fiber, aramid fiber, and potassium titanate whisker; and silica, mica. Among these, carbon black and silica are suitably used, and carbon black is particularly suitably used.

As the carbon black, furnace black, acetylene black, thermal black, channel black, and graphite and the like may be used. Among these, furnace black is preferably used. Specific examples thereof include SAF, ISAF, ISAF-HS, ISAF-LS, IISAF-HS, HAF, HAF-HS, HAF-LS, MAF, and FEF. These may be used singly or in combinations of two or more.

As the silica, for example, dry type white carbon, wet type white carbon, colloidal silica, and precipitated silica and the like may be used. Among these, wet type white carbon containing hydrous silicic acid as a main ingredient is preferable. These may be used singly or in combinations of two or more.

The amount of the inorganic filler blended in the rubber composition of the present invention is preferably 20 to 200 parts by weight, more preferably 25 to 150 parts by weight, and still more preferably 30 to 100 parts by weight per 100 parts by weight of the solid rubber (A). The amount of the inorganic filler blended is set to be within the above range, and thus the mechanical characteristics of the obtained crosslinked rubber can be appropriately improved.

The rubber composition of the present invention preferably further contains a crosslinking agent. A crosslinking agent which can crosslink the solid rubber (A) according to the kind of the solid rubber (A) may be suitably selected. Examples thereof include sulfur, sulfur halide, organic peroxide, quinone dioximes, an organic polyvalent amine compound, zinc acrylates, and an alkylphenol resin having a methylol group. Among these, sulfur is preferably used. The amount of the crosslinking agent blended in the rubber composition of the present invention is preferably 0.5 to 5 parts by weight, more preferably 0.7 to 4 parts by weight, and still more preferably 1 to 3 parts by weight per 100 parts by weight of the solid rubber (A).

The rubber composition of the present invention may contain blending agents such as a crosslinking accelerator, a crosslinking activator, an antiaging agent, an activator, process oil, a plasticizer, and wax in necessary amounts according to an ordinary method.

Examples of the crosslinking accelerator include a sulfenamide-based crosslinking accelerators such as N-cyclohexyl-2-benzothiazolylsulfenamide, N-t-butyl-2-benzothiazolylsulfenamide, N-oxyethylene-2-benzothiazolylsulfenamide, N-oxyethylene-2-benzothiazolylsulfenamide, and N,N'-diisopropyl-2-benzothiazolylsulfenamide; guanidine-based crosslinking accelerators such as 1,3-diphenylguanidine, 1,3-diorthotolylguanidine, and 1-orthotolylbiguanidine; thiourea-based crosslinking accelerators; thiazole-based crosslinking accelerators; thiuram-based crosslinking accelerators; dithiocarbamic acid-based crosslinking accelerators; and xanthogenic acid-based crosslinking accelerators. Among these, one containing a sulfenamide-based crosslinking accelerator is particularly preferable. These crosslinking accelerators may be used singly or in combinations of two or more. The amount of the crosslinking accelerator blended is preferably 0.1 to 15 parts by weight, and more preferably 0.5 to 5 parts by weight per 100 parts by weight of the solid rubber (A).

Examples of the crosslinking activator include a higher fatty acid such as stearic acid and zinc oxide. The amount of the crosslinking activator blended is not particularly limited. When a higher fatty acid is used as the crosslinking activator, the amount thereof blended is preferably 0.05 to 15 parts by weight, and more preferably 0.5 to 5 parts by weight per 100 parts by weight of the solid rubber (A). When zinc oxide is used as the crosslinking activator, the amount thereof blended is preferably 0.05 to 15 parts by weight, and more preferably 0.5 to 5 parts by weight per 100 parts by weight of the solid rubber (A).

As the process oil, a mineral oil or a synthetic oil may be used. As the mineral oil, an aroma oil, a naphthene oil, and a paraffin oil and the like are usually used.

The method for obtaining the rubber composition of the present invention is not particularly limited, and the components may be kneaded in accordance with an ordinary method. In one example, a blending agent such as an inorganic filler excluding a component unstable to the crosslinking agent and heat, the solid rubber (A), and the liquid monocyclic olefin ring-opened polymer (B) are kneaded, and the kneaded product is then mixed with the component unstable to the crosslinking agent and heat, and thus the intended composition can be obtained. The temperature for kneading the blending agent such as an inorganic filler excluding a component unstable to the crosslinking agent and heat, the solid rubber (A), and the liquid monocyclic olefin ring-opened polymer (B) is preferably 70 to 200° C., and more preferably 100 to 180° C. The kneading time is preferably 30 seconds to 30 minutes. The kneaded product and the component unstable to the crosslinking agent and heat are mixed usually at 100° C. or less, and preferably after being cooled to 80° C. or less.

<Crosslinked Rubber>

A crosslinked rubber of the present invention can be obtained by crosslinking the rubber composition of the present invention.

The crosslinking method is not particularly limited, and may be selected depending on the shape and size of the crosslinked rubber. The rubber composition may be filled in a mold and heated, and thus crosslinked at the same time as molding, or the rubber composition molded in advance may be heated and crosslinked. The crosslinking temperature is preferably 120 to 200° C., more preferably 140 to 180° C., and the crosslinking time is usually about 1 to 120 minutes.

Depending on shape and size of the crosslinked rubber, crosslinking may not be fully progressed inside the crosslinked rubber even when the crosslinking is found on the surface of the crosslinked rubber. In such case, secondary crosslinking may be performed by further heating.

As the heating method, general methods used for crosslinking rubber such as press heating, steam heating, oven heating, and heat wave heating may be suitably selected.

The crosslinked rubber of the present invention thus obtained is obtained by using the rubber composition of the present invention containing the solid rubber (A) and the liquid monocyclic olefin ring-opened polymer (B), wherein a proportion of the liquid monocyclic olefin ring-opened polymer (B) is 1 to 100 parts by weight per 100 parts by weight of the solid rubber (A). Therefore, the crosslinked rubber has high tensile strength and excellent heat resistance and ozone resistance. The crosslinked rubber of the present invention can be suitably used for various applications such as various seal materials (such as antivibration rubber, a radiator gasket, a brake fluid seal material, and a water-based liquid seal material) which are used for vehicles such as a railroad and an automobile, and various rubber members (such as an accumulator bladder); electric insulating covering materials (such as antivibration rubber, a conveyer belt, electric wiring, and a cable) used for various industrial machines, and various rubber members (such as an air spring); shoe rubber materials used for a bridge and a building; seal materials used in various fields such as air and space fields, and a shipping field (such as a sealing material, a packing, a rubber plug, and an O-ring); fenders used in the shipping field; and strength imparting agents for a pressure-sensitive adhesive and an adhesive, taking advantage of such characteristics.

EXAMPLES

Hereinafter, the present invention will be described based on more detailed Examples, but the present invention is not limited to these Examples. Hereinafter, "parts" are based on weight unless otherwise indicated. Various tests and evaluations were performed in accordance with the following methods.

[Weight-Average Molecular Weight (Mw) and Number Average Molecular Weight (Mn) of Liquid Monocyclic Olefin Ring-Opened Polymer]

Using gel permeation chromatography (GPC) system HLC-8220 (manufactured by Tosoh Corporation) with tetrahydrofuran as a solvent and two H-type columns HZ-M (manufactured by Tosoh Corporation) connected in series, the number average molecular weight (Mn) and weight average molecular weight (Mw) of the liquid monocyclic olefin ring-opened polymer were measured at a column temperature of 40° C. A differential refractometer "RI-8320" (manufactured by Tosoh Corporation) was used as a detector. The weight-average molecular weight (Mw) and number average molecular weight (Mn) of the liquid monocyclic olefin ring-opened polymer were measured as values converted to polystyrene.

[Glass Transition Temperature (Tg) and Melting Point (Tm) of Liquid Monocyclic Olefin Ring-Opened Polymer]

Measurement was performed at a temperature increase rate of 10° C./min within a temperature range of from −150° C. to 40° C. using a differential scanning calorimeter (DSC, product name: "X-DSC7000", manufactured by Hitachi High-Tech Science Corporation).

[Monomer Unit Composition Ratio in Liquid Monocyclic Olefin Ring-Opened Polymer]

A monomer unit composition ratio in the liquid monocyclic olefin ring-opened polymer was determined from $^1$H-NMR spectrometry.

[Melt Viscosity of Liquid Monocyclic Olefin Ring-Opened Polymer]

A melt viscosity at 25° C. was measured by a Brookfield viscometer DV-II+Pro (manufactured by Brookfield Corporation). A shear rate during measurement was adjusted within the range of from 1.2 to 10 sec$^{-1}$ according to the viscosity.

[Ratio of Introduction of Modified Group at Polymer Chain End of Liquid Monocyclic Olefin Ring-Opened Polymer]

A liquid monocyclic olefin ring-opened polymer was dissolved in deuteriochloroform, and the deuteriochloroform solution in which the liquid monocyclic olefin ring-opened polymer was dissolved was subjected to $^1$H-NMR spectrometry, to measure the ratio of a peak integral value peculiar to a modified group and a peak integral value derived from an olefin. The ratio of introduction of the modified group at the polymer chain end was calculated based on the ratio of the measured peak integral values and the measurement results of the number average molecular weight (Mn) by GPC. The ratio of introduction of the modified group at the polymer chain end was taken as the rate of the number of modified groups to the number of liquid monocyclic olefin ring-opened polymer chains. That is, the ratio of introduction of the modified group: 100% represents a state where a modified group is introduced to the liquid monocyclic olefin ring-opened polymer chain of one molecule. The ratio of introduction of the modified group: 200% represents a state where a modified group is introduced to each of both ends of the liquid monocyclic olefin ring-opened polymer chain of one molecule.

[Tensile Strength of Crosslinked Rubber]

A dumbbell test piece was obtained by punching out a sheet-shaped crosslinked rubber in a No. 6 dumbbell shape in parallel to a grain direction. The obtained dumbbell test piece was subjected to a tensile test under conditions of 23° C. and 500 mm/min based on JIS K6251 using a tensile test machine (product name: "TENSOMETER10K", manufactured by ALPHA TECHNOLOGIES) as a test machine, to measure tensile strength $S_0$.

[Change Rate in Tensile Strength Before and After Heat Treatment of Crosslinked Rubber]

A dumbbell test piece was obtained in the same manner as in the tensile test, and the obtained dumbbell test piece was heat-treated under conditions of 100° C. and 72 hours in a Geer's Aging Oven (product name: "AG-1110", manufactured by Ueshima Seisakusho Co., Ltd.), to obtain the heat-treated test piece. The heat-treated test piece was subjected to a tensile test in the same manner as in the tensile test, to measure tensile strength $S_1$ of the heat-treated test piece. From the obtained measurement results, a change rate $\Delta S$ of the tensile strength before and after a heat treatment was calculated in accordance with the following formula. As the Absolute value of the change rate $\Delta S$ of the tensile strength before and after a heat treatment is smaller, the variation in the tensile strength caused by the heat treatment is smaller, which is preferable.

Change rate $\Delta S$ (%) of tensile strength before and after heat treatment={(tensile strength $S_1$ (MPa) after heat treatment−tensile strength $S_0$ (MPa) before heat treatment/tensile strength $S_0$ (MPa) before heat treatment}×100

[Static Ozone Strain Testing]

A dumbbell test piece was obtained by punching out a sheet-shaped crosslinked rubber in a No. 1 dumbbell shape. The dumbbell test piece was subjected to static ozone strain testing under conditions of a test temperature of 40° C., an ozone concentration of 50 pphm, tensile distortion of 20%, and a test time of 24 hours in accordance with JIS K6259 in an ozone weather meter (product name: "OMS-HN", manufactured by Suga Test Instruments Co., Ltd.). The ozone resistance of the test piece after the static ozone strain testing was evaluated by observing the sizes of the cracks of the test piece according to the crack state observation method in accordance with JIS K 6259.

The sizes of the cracks of the test piece were evaluated according to the following criteria.

1: Cracks are not visible by the naked eye, but can be confirmed by magnifier of 10 magnifications.

2: Cracks are visible by the naked eye.

3: Cracks are deep and relatively large (less than 1 mm).

4: Cracks are deep and large (1 mm or more and less than 3 mm).

5: Cracks of 3 mm or more are present, or cutting is likely to occur.

Synthetic Example 1

Synthesis of Liquid Monocyclic Olefin Ring-Opened Polymer (B-1)

Under a nitrogen atmosphere, a pressure resistant glass reaction vessel in which a magnetic stirrer was placed was charged with 1000 parts of cyclopentene, 21.5 parts of 1-hexene, and 990 parts of toluene. Then, this was charged with 0.068 parts of dichloro-(3-phenyl-1H-inden-1-ylidene) bis(tricyclohexylphosphine)ruthenium (II) dissolved in 10 parts of toluene to cause the polymerization reaction at room temperature for 3 hours. After the polymerization reaction for 3 hours, an excess of vinylethylether was added to stop the polymerization, and a large quantity of methanol was then added to precipitate a polymer. Then, the supernatant solution was removed to recover the precipitated product. The solvent remaining in the recovered precipitated product was then removed by an evaporator, and then vacuum-dried at 50° C. for 24 hours, to obtain 700 parts of a liquid monocyclic olefin ring-opened polymer (B-1). The obtained liquid monocyclic olefin ring-opened polymer (B-1) had Mw: 7,600, Mn: 4,600, Tg: −92° C., and Tm: 23° C. The liquid monocyclic olefin ring-opened polymer had a melt viscosity measured at 25° C.: 9 Pa·s.

Synthetic Example 2

Synthesis of Liquid Monocyclic Olefin Ring-Opened Polymer (B-2)

850 parts of a liquid monocyclic olefin ring-opened polymer (B-2) was obtained in the same manner as in Synthetic Example 1 except that 1000 parts of cyclooctadiene was used in place of 1000 parts of cyclopentene. The obtained liquid monocyclic olefin ring-opened polymer (B-2) had Mw: 14,800, Mn: 8,500, and Tg: −104° C. Tm was not observed. The liquid monocyclic olefin ring-opened polymer had a melt viscosity measured at 25° C. of 20 Pa·s.

Synthetic Example 3

Synthesis of Liquid Monocyclic Olefin Ring-Opened Polymer having Hydroxyl Group at Each of Both Ends (B-3)

Under a nitrogen atmosphere, a pressure resistant glass reaction vessel in which a magnetic stirrer was placed was charged with 750 parts of cyclopentene, 250 parts of 2-norbornene, 28.2 parts of cis-2-butene-1,4-diol, and 990 parts of tetrahydrofuran. Then, this was charged with 0.068 parts of dichloro-(3-phenyl-1H-inden-1-ylidene)bis(tricyclohexylphosphine)ruthenium (II) dissolved in 10 parts of tetrahydrofuran to cause the polymerization reaction at room temperature for 3 hours. After the polymerization reaction for 3 hours, an excess of vinylethylether was added to stop the polymerization, and a large quantity of methanol was then added to precipitate a polymer. Then, the supernatant solution was removed to recover the precipitated product. The solvent remaining in the recovered precipitated product was then removed by an evaporator, and then vacuum-dried at 50° C. for 24 hours, to obtain 750 parts of a liquid monocyclic olefin ring-opened polymer having a hydroxyl group at each of both ends (B-3). The obtained liquid monocyclic olefin ring-opened polymer having a hydroxyl group at each of both ends (B-3) had Mw: 13,400, Mn: 6,300, a content rate of a monomer unit derived from cyclopentene in the monocyclic olefin ring-opened polymer: 88 mol %, a content rate of a monomer unit derived from 2-norbornene: 12 mol %, an end modified group introduction ratio: 200%, and Tg: −72° C. Tm was not observed. The liquid monocyclic olefin ring-opened polymer had a melt viscosity measured at 25° C. of 15 Pa·s.

Example 1

100 parts of polybutadiene rubber (trade name: "Nipol BR1220", manufactured by Zeon Corporation, weight-average molecular weight (Mw): 468,000, Mooney viscosity (ML1+4, 100° C.): 44, a solid at normal temperature) was masticated in a Banbury mixer for 30 seconds. Then, 50 parts of the liquid monocyclic olefin ring-opened polymer (B-1) obtained in Synthetic Example 1, 2 parts of stearic acid, 3 parts of zinc oxide, 60 parts of carbon black (trade name: "IRB #8", manufactured by CONTINENTAL CARBON COMPANY), and 15 parts of process oil (trade name: "Aromax T-DAE", manufactured by JXTG Nippon Oil & Energy Corporation) were added, followed by kneading at 110° C. for 180 seconds. The blending agents remaining on the upper part of a ram were cleaned, followed by kneading for 150 seconds, and discharging the kneaded product from a mixer. Then, the obtained kneaded product was cooled to room temperature, and the cooled kneaded product, 1.5 parts of sulfur, and 0.9 parts of N-(tert-butyl)-2-benzothiazolylsulfenamide (trade name: "Nocceler NS-P", manufactured by Ouchi Shinko chemical industrial co., ltd.) as a crosslinking accelerator were then kneaded in an open roll at 23° C. to obtain a sheet-shaped rubber composition. Then, the obtained rubber composition was subjected to press crosslinking at 160° C. for 20 minutes to obtain a sheet-shaped crosslinked rubber having a thickness of 1 mm. In accordance with the above method, the obtained sheet-shaped crosslinked rubber was subjected to measurements of tensile strength and a change rate in tensile strength before and after a heat treatment, and static ozone strain testing. The results are shown in Table 1.

Example 2

A rubber composition and a crosslinked rubber were obtained in the same manner as in Example 1 except that 20 parts of the liquid monocyclic olefin ring-opened polymer (B-2) obtained in Synthetic Example 2 was used in place of 50 parts of the liquid monocyclic olefin ring-opened polymer (B-1), and evaluated in the same manner as in Example 1. The results are shown in Table 1.

Example 3

A rubber composition and a crosslinked rubber were obtained in the same manner as in Example 1 except that 10 parts of the liquid monocyclic olefin ring-opened polymer having a hydroxyl group at each of both ends (B-3), obtained in Synthetic Example 3 was used in place of 50 parts of the liquid monocyclic olefin ring-opened polymers (B-1), and evaluated in the same manner as in Example 1. The results are shown in Table 1.

Example 4

A rubber composition and a crosslinked rubber were obtained in the same manner as in Example 1 except that 100 parts of natural rubber ("SMR-CV60", weight-average molecular weight (Mw): 633,000, Mooney viscosity (ML1+4, 100° C.): 60, a solid at normal temperature) was used in place of 100 parts of the polybutadiene rubber, and evaluated in the same manner as in Example 1. The results are shown in Table 1.

Example 5

A rubber composition and a crosslinked rubber were obtained in the same manner as in Example 1 except that 100 parts of styrene butadiene rubber (trade name: "Nipol NS616", manufactured by Zeon Corporation, weight-average molecular weight (Mw): 426,000, Mooney viscosity (ML1+4, 100° C.): 62, a solid at normal temperature) was used in place of 100 parts of the polybutadiene rubber, and evaluated in the same manner as in Example 1. The results are shown in Table 1.

Comparative Example 1

A rubber composition and a crosslinked rubber were obtained in the same manner as in Example 1 except that 20 parts of liquid polybutadiene (trade name: Krasol LBH-P3000, manufactured by Cray Valley, weight-average molecular weight (Mw): 3,400, a melt viscosity measured at 25° C.: 20 Pa·s) was used in place of 50 parts of the liquid monocyclic olefin ring-opened polymer (B-1), and evaluated in the same manner as in Example 1. The results are shown in Table 1.

Comparative Example 2

A rubber composition and a crosslinked rubber were obtained in the same manner as in Example 1 except that 50 parts of the liquid monocyclic olefin ring-opened polymer (B-1) was not blended, and evaluated in the same manner as in Example 1. The results are shown in Table 1.

TABLE 1

|  |  | Examples | | | | | Comparative Examples | |
|---|---|---|---|---|---|---|---|---|
|  |  | 1 | 2 | 3 | 4 | 5 | 1 | 2 |
| Blending | | | | | | | | |
| Polybutadiene rubber (solid form) | (Parts) | 100 | 100 | 100 | — | — | 100 | 100 |
| Natural rubber (solid form) | (Parts) | — | — | — | 100 | — | — | — |
| Styrene butadiene rubber (solid form) | (Parts) | — | — | — | — | 100 | — | — |
| Liquid monocyclic olefin ring-opened polymer (B-1) | (Parts) | 50 | — | — | 50 | 50 | — | — |
| Liquid monocyclic olefin ring-opened polymer (B-2) | (Parts) | — | 20 | — | — | — | — | — |
| Liquid monocyclic olefin ring-opened polymer having hydroxyl group at each of both ends (B-3) | (Parts) | — | — | 10 | — | — | — | — |
| Liquid polybutadiene | (Parts) | — | — | — | — | — | 20 | — |
| Stearic acid | (Parts) | 2 | 2 | 2 | 2 | 2 | 2 | 2 |
| Zinc oxide | (Parts) | 3 | 3 | 3 | 3 | 3 | 3 | 3 |
| Carbon black | (Parts) | 60 | 60 | 60 | 60 | 60 | 60 | 60 |
| Sulfur | (Parts) | 1.5 | 1.5 | 1.5 | 1.5 | 1.5 | 1.5 | 1.5 |
| N-(tert-butyl)-2-benzothiazolyl-sulfenamide | (Parts) | 0.9 | 0.9 | 0.9 | 0.9 | 0.9 | 0.9 | 0.9 |
| Process oil | (Parts) | 15 | 15 | 15 | 15 | 15 | 15 | 15 |
| Evaluation results | | | | | | | | |
| Tensile strength | (MPa) | 16.8 | 17.4 | 18.5 | 24.5 | 17.8 | 15.9 | 19.9 |
| Change rate ΔS in tensile strength before and after heat treatment | (%) | −14 | −17 | −18 | −12 | −14 | −40 | −40 |
| Ozone resistance | | 1 | 1 | 1 | 1 | 1 | 3 | 3 |

As shown in Table 1, the crosslinked rubber obtained by using the rubber composition obtained by blending 100 parts by weight of the solid rubber (A) with 1 to 100 parts by weight of the liquid monocyclic olefin ring-opened polymer (B) had high tensile strength, a change rate ΔS in tensile strength before and after a heat treatment suppressed to a low level, and excellent heat resistance and ozone resistance (Examples 1 to 5).

Meanwhile, when liquid polybutadiene was used as the liquid polymer, the absolute value of a change rate ΔS of tensile strength before and after a heat treatment was large, which caused poor heat resistance and ozone resistance (Comparative Example 1).

Even when the liquid polymer was not blended, the absolute value of a change rate ΔS in tensile strength before and after a heat treatment was large, which caused poor heat resistance and ozone resistance (Comparative Example 2).

The invention claimed is:

1. A rubber composition comprising:
   a solid rubber (A) having a weight-average molecular weight (Mw) of 100,000 or more, and that is at least one selected from the group consisting of natural rubber (NR), polyisoprene rubber (IR), styrene butadiene rubber (SBR), polybutadiene rubber (BR), styrene-isoprene copolymer rubber, butadiene-isoprene copolymer rubber, polyisoprene-SBR block copolymer rubber, polystyrene-polybutadiene-polystyrene block copolymer, emulsion polymerized styrene-acrylonitrile-butadiene copolymer rubber, acrylonitrile-butadiene copolymer rubber, ethylene propylene diene rubber (EPDM), ethylene-propylene rubber, acrylic rubber, epichlorohydrin rubber, fluororubber, silicone rubber, chloroprene rubber, and urethane rubber; and
   a liquid monocyclic olefin ring-opened polymer (B) having a weight-average molecular weight (Mw) of 1,000 to 50,000,
   wherein:
   a proportion of the liquid monocyclic olefin ring-opened polymer (B) is 1 to 100 parts by weight per 100 parts by weight of the solid rubber (A),
   the liquid monocyclic olefin ring-opened polymer (B) comprises 70 mol % or more of a structural unit derived from cyclopentene, based on all repeating units in the liquid monocyclic olefin ring-opened polymer (B), and
   the solid rubber (A) and the liquid monocyclic olefin ring-opened polymer (B) are the only polymer components in the rubber composition.

2. The rubber composition according to claim 1, wherein the liquid monocyclic olefin ring-opened polymer (B) is a polymer containing only a structural unit derived from cyclopentene, or a copolymer containing a structural unit derived from cyclopentene and a structural unit derived from a monomer copolymerizable with cyclopentene.

3. The rubber composition according to claim 1, wherein the liquid monocyclic olefin ring-opened polymer (B) has a melt viscosity of 3,000 Pa·s or less as measured at a temperature of 25° C. using a Brookfield viscometer.

4. The rubber composition according to claim 1, wherein the liquid monocyclic olefin ring-opened polymer (B) has a glass transition temperature of −50° C. or less.

5. The rubber composition according to claim 1, wherein the solid rubber (A) is at least one rubber selected from the group consisting of natural rubber, polyisoprene rubber, styrene butadiene rubber, and polybutadiene rubber.

6. The rubber composition according to claim 1, further comprising an inorganic filler.

7. The rubber composition according to claim 1, further comprising a crosslinking agent.

8. A crosslinked rubber obtained by crosslinking the rubber composition according to claim 7.

9. The rubber composition according to claim 1, wherein the liquid monocyclic olefin ring-opened polymer (B) has a molecular structure containing only carbon atoms and hydrogen atoms.

10. The rubber composition according to claim 1, wherein a content of the liquid monocyclic olefin ring-opened polymer (B) is 20 to 100 parts by weight per 100 parts by weight of the solid rubber (A).

* * * * *